United States Patent [19]
Lansdell

[11] Patent Number: 5,228,996
[45] Date of Patent: Jul. 20, 1993

[54] METHOD FOR TREATING WASTE WATER

[76] Inventor: Mark Lansdell, #42A Residencias Oasis Avenida Cantaura, Caracas, Venezuela

[21] Appl. No.: 655,913

[22] Filed: Feb. 15, 1991

[51] Int. Cl.$^5$ .............................................. C02F 3/30
[52] U.S. Cl. .................................... 210/605; 210/607; 210/621; 210/624; 210/629; 210/630
[58] Field of Search ........ 210/605, 607, 610, 621–624, 210/629, 630, 906

[56] References Cited

U.S. PATENT DOCUMENTS

| | | | |
|---|---|---|---|
| 4,488,967 | 12/1984 | Block et al. | 210/605 |
| 4,663,044 | 5/1987 | Goronszy | 210/610 |
| 4,948,510 | 8/1990 | Todd et al. | 210/605 |
| 4,975,197 | 12/1990 | Wittmann et al. | 210/629 |

*Primary Examiner*—Thomas Wyse
*Attorney, Agent, or Firm*—Shlesinger Arkwright & Garvey

[57] ABSTRACT

Conventional biological processes for treating wastewater include the so-called activated sludge process which is continuous and the sequencing batch reactor (SBR) activated sludge process. The first process requires the use of dedicated, relatively expensive external clarifiers, and the second process is inefficient in terms of treatment volume. A modified sequencing batch reactor process and system enable the efficient, continuous treatment of wastewater, combining the advantages of the SBR and activated sludge processes. Wastewater is treated in three contiguous treatment sections, each of which includes a plurality of contiguous cells. In a first series of operations, the flow direction is from the first to the third sections, and in a second series of operations the flow is reversed. In each series of operations, the first step is to aerobically treat the wastewater, and then allow the sludge to settle before discharging the treated wastewater from the system. The settling steps of the process include pre-settling while wastewater is flowing through a section, and quiescent settling while aerobic treatment and flowing or pre-settling are occurring in other sections of the system.

10 Claims, 7 Drawing Sheets

METHOD FOR TREATING WASTE WATER

BACKGROUND OF THE INVENTION

1. Field of the Invention

This invention relates to a method and a system for the biological treatment of wastewater.

More specifically, the method and system of the present invention are designed for the biological removal of contamination in the form of organic material, and optionally the biological removal of the nutrients, nitrogen and phosphorus from wastewater.

2. Discussion of the Prior Art

The biological treatment of sewage and other wastewaters is by no means new. Examples of methods and apparatuses for effecting such treatment are described in Canadian Patents Nos. 997,488, issued to B. K. Tholander et al on Sep. 21, 1976 and 1,117,042, issued to M. L. Spector on Jan. 26, 1982, and U.S. Pat. Nos. 2,907,463, issued to D. J. N. Light et al on Oct. 6, 1959; 4,279,753, issued to N. E. Nielson et al on Jul. 21, 1981; 4,430,224, issued to U. Fuchs on Feb. 7, 1984; 4,431,543, issued to Y. Matsuo et al on Feb. 14, 1984; 4,522,722, issued to E. M. Nicholas on Jun. 11, 1985; 4,663,044, issued to M. C. Goronszy on May 5, 1987; 4,798,673, issued to C. Huntington on Jan. 17, 1989 and 4,948,510, issued to M. D. Todd et al on Aug. 14, 1990.

In general, conventional activated sludge processes and modifications thereto have recently been shown to be able to accomplish the objectives set out above, namely the biological removal of contamination from wastewaters, but the cost of specialized clarifiers required to settle and pumps to recycle biological solids is quite high. Moreover, the size, complexity and operating problems encountered with such systems make them unattractive to potential users. In addition, the basic activated sludge process often suffers from poor treatment efficiency and unstable performance because of the continuous flow through characteristics in the final clarifier and the resulting constant sludge management requirements.

As a consequence of the foregoing, during the past ten years improved final clarification and solids removal has been sought by using larger and improved designs for final clarifiers. Moreover, final effluent filtration is often necessary to reliably meet permitted environmental standards.

There has been a recent revival of interest in the sequencing batch reactor (SBR) activated sludge process because of the inherently more efficient batch settling and higher treatment efficiency possible for batch organic contaminants removal with the SBR process compared to conventional continuous flow activated sludge process. The SBR process uses the same vessel for batch mixing, aerobic treatment and quiescent batch settling. Thus, the SBR process eliminates the major cost of dedicated final clarifiers and sludge return pumps necessary for the conventional activated sludge process as well as improving upon solids removal performance.

However, the SBR process has some disadvantages, the principle one being that the process does not operate with continuous flow, but requires intermittent operation for cycles of fill, react, settle, decant and idle. The result can be a much lower volume to use ratio than that achieved using the conventional flow through activated sludge process.

Accordingly, the SBR process is generally not cost effective for flows greater than five to ten MGD. Other disadvantages of the SBR process are that significant head loss occurs from the influent to the final effluent, requiring additional energy and pumping costs, and effluent flow is intermittent which can result in the necessity of multiple units or flow equalization systems to prevent peak loadings and adverse impacts on receiving waters.

Finally, the basic process and design limitations of the SBR process make it difficult to achieve the same high efficiency biological nutrient removal possible using the continuous flow activated sludge process.

GENERAL DESCRIPTION OF THE INVENTION

The principle object of the present invention is to maintain the benefits which the SBR process has over the conventional continuous flow, constant level, activated sludge process, while substantially reducing or eliminating the disadvantages of the SBR process.

Another object of the invention is to provide a relatively high treatment efficiency process, and a system which is simple and hence cost effective to design, construct, operate and maintain.

Yet another object of the invention is to provide a wastewater treating process and apparatus which permit the removal of nitrogen and/or phosphorus from wastewater.

According to one aspect, the invention relates to an activated sludge wastewater treatment process comprising:

(a) providing a reactor including first, second and third basins each defining an elongated flow path and each having an inlet end and an outlet end, means for hydraulically interconnecting the basins, first, second and third wastewater inlet means for respectively feeding wastewater from a wastewater receiver to the first or the second or the third basin, and first and second treated effluent outlet means for respectively discharging treated effluent from the outlet ends of the first and third basins, (b) the first phase steps of:
  (i) feeding wastewater from the wastewater receiver to the inlet end of the first basin while interrupting flow from the wastewater receiver to the second and third basins;
  (ii) permitting flow from the outlet end of the first basin into inlet end of the second basin and from the outlet end of the second basin into the inlet end of the third basin,
  (iii) discharging treated effluent from the outlet end of the third basin through the second treated effluent outlet means while preventing flow through the first treated effluent outlet means;
  (iv) subjecting wastewater in at least a portion of the first and second basins to aerobic treatment while interrupting aerobic treatment of the wastewater in the third basin to allow settling of the sludge in the third basin;

(c) the second phase steps of:
  (i) feeding wastewater to be treated from the wastewater receiver to the inlet end of the second basin while preventing flow from the wastewater receiver to the first and third basins;
  (ii) permitting flow from the outlet end of the second basin into the inlet end of the third basin;
  (iii) discharging treated effluent from the outlet end of the third basin through the second treated effluent outlet means while preventing flow through the first treated effluent outlet means;

(iv) subjecting wastewater in at least a portion of the first and second basins to aerobic treatment while interrupting aerobic treatment of the wastewater in the third basin to allow settling of the sludge in the third basin;

(d) the third phase steps of:
  (i) feeding wastewater to be treated from the wastewater receiver to the inlet end of the second basin while preventing flow from the wastewater receiver to the first and third basins,
  (ii) permitting flow from the outlet end of the second basin to the inlet end of the third basin;
  (iii) discharging treated effluent from the outlet end of the third basin through the second treated effluent outlet means while preventing flow through the first treated effluent means;
  (iv) subjecting wastewater in at least a portion of the second basin to aerobic treatment while interrupting aerobic treatment of wastewater in the first and third basins to allow settling of the sludge therein;

(e) the fourth phase steps of:
  (i) feeding wastewater from the wastewater receiver to the inlet end of the third basin while preventing flow from the wastewater receiver to the first and second basins;
  (ii) permitting flow from the outlet end of the third basin into the inlet end of the second basin and from the outlet end of the second basin into the inlet end of the first basin;
  (iii) discharging treated effluent from the outlet end of the first basin through the first treated effluent outlet means while preventing flow through the second treated effluent means;
  (iv) subjecting wastewater in at least a portion of the third and second basins to aerobic treatment while interrupting aerobic treatment of wastewater in the first basin to allow settling of the sludge in the first basin;

(f) the fifth phase steps of:
  (i) feeding wastewater from the wastewater receiver to the inlet end of the second basin while preventing flow from the wastewater receiver to the first and third basins;
  (ii) permitting flow from the outlet end of the second basin into the inlet end of the first basin;
  (iii) discharging treated effluent from the outlet end of the first basin through the first treated effluent outlet means while preventing flow through the second treated effluent outlet means;
  (iv) subjecting wastewater in at least a portion of the third and second basins to aerobic treatment while interrupting aerobic treatment of wastewater in the first basin to allow settling of the sludge therein;

(g) the sixth phase steps of:
  (i) feeding wastewater to be treated from the wastewater receiver to the inlet end of the second basin while preventing flow from the wastewater receiver to the first and third basins;
  (ii) permitting flow from the outlet end of the second basin into the inlet end of the first basin;
  (iii) discharging treated effluent from the outlet end of the first basin through the first treated effluent inlet means while preventing flow through the second treated effluent outlet means;
  (iv) subjecting wastewater in at least a portion of the second basin to aerobic treatment and interrupting aerobic treatment of wastewater in the first and third basins to allow settling of the sludge therein;

(h) repeating the first to sixth phase steps.

According to another aspect, the invention relates a system for the biological removal of the nutrients nitrogen and phosphorus from wastewater comprising a wastewater receiver, a reactor including first, second and third basins each defining an elongated flow path having an inlet end and an outlet end remote from the inlet end, first, second and third wastewater inlet means respectively communicating with discrete anaerobic treatment cells located in the first, second and third basins adjacent the inlet ends thereof, first and second treated effluent outlet means respectively communicating with the first and third basins adjacent the outlet ends thereof, each said basin including a plurality of discrete, contiguous cells, partition means separating the cells in each basin, wherein wastewater can flow between adjacent cells between an inlet end and an outlet end of each basin via one was passage means, first one-way transfer passage means for passing fluid from the outlet end of the first basin to the inlet end of the second basin, second one-way transfer passage means for passing fluid from the outlet end of the second basin to the inlet end of the third basin, a third one-way transfer passage means for passing fluid from the outlet end of the third basin to the inlet end of the second basin, and fourth one-way transfer passage means for passing fluid from the outlet end of the second basin to the inlet end of the first basin, means for aerobically treating wastewater in at least a portion of each of the first, second and third basins, wastewater supply control means selectively operable to supply wastewater from the wastewater receiver to the first or the second or the third wastewater inlet means, and treated effluent control means selectively operable to pass treated effluent from the first or the second effluent discharge means.

BRIEF DESCRIPTION OF THE DRAWINGS

The invention will be described in greater detail with reference to the accompanying drawings, which illustrate preferred embodiments of the invention, and wherein.

DESCRIPTION OF PREFERRED EMBODIMENT

Referring to FIGS. 1 to 6 of the drawings, one embodiment of the system of the present invention includes an inlet receptacle 1 for receiving wastewater introduced through an inlet pipe 2. A constant level overflow weir 4 is provided in the receptacle 1. Wastewater is discharged from the receptacle 1 to any of three treatment basins generally indicated at 6, 7 and 8. The first treatment basin 6 is defined by four interconnected discrete cells 10, 11, 12 and 13. Wastewater from the receptacle 1 flows through a valve 15 in a line 16 to the inlet cell 10 of the first treatment basin 6. Each of the cells 10 to 13 is equipped with at least one aerator 18. A one-way constant level overflow weir 19 is provided in the last cell 13. Wastewater flows form the cell 13 via a valve 20 into the second treatment basin 7.

The second treatment basin 7 is defined by four cells 22, 23, 24 and 25. An aerator 18 is also provided in each of the cells 22 to 25. One-way valve 27 in cell 25 of treatment basin 7 prevents back flow of the wastewater stream. The last cell 25 is connected to an overflow receiver 29 by a line 30 containing a normally open valve 32. Excess biological sludge is discharged to the receiver 29 at a rate suitable for maintaining the desired level of activated sludge and mean cell residence time in the various treatment cells. Solids are removed from the excess sludge entering the receiver 29, and liquid supernatant is typically returned to the inlet receptacle 1.

The second sludge treatment basin 7 is connected to the third treatment basin 8 by a one-way valve 34 between the cell 25 and one end of the treatment basin 8. Like the other treatment basins, the third basin 8 is defined by four contiguous cells 36, 37, 38 and 39. Wastewater from the receptacle 1 can be introduced into the cell 36 of treatment basin 8 via a line 41 containing a valve 42. The cell 39 of the treatment basin 8 is connected to cell 22 of the second treatment basin 7 by a one-way valve 43. A constant level overflow weir 44 is also provided at the discharge end of the cell 39.

Effluent from the cell 13 of the first treatment basin 6 discharged over the weir 19 flows through a valve 45, a line 46 and a valve 47 in a final effluent discharge line 49. The cell 39 of the treatment basin 8 is also connected to the line 49 by a line 50 containing a valve 52. Alternatively, effluent from the cell 13 or 39 can flow through the line 50 and a pump 53 to the inlet pipe 2.

Figure 5:
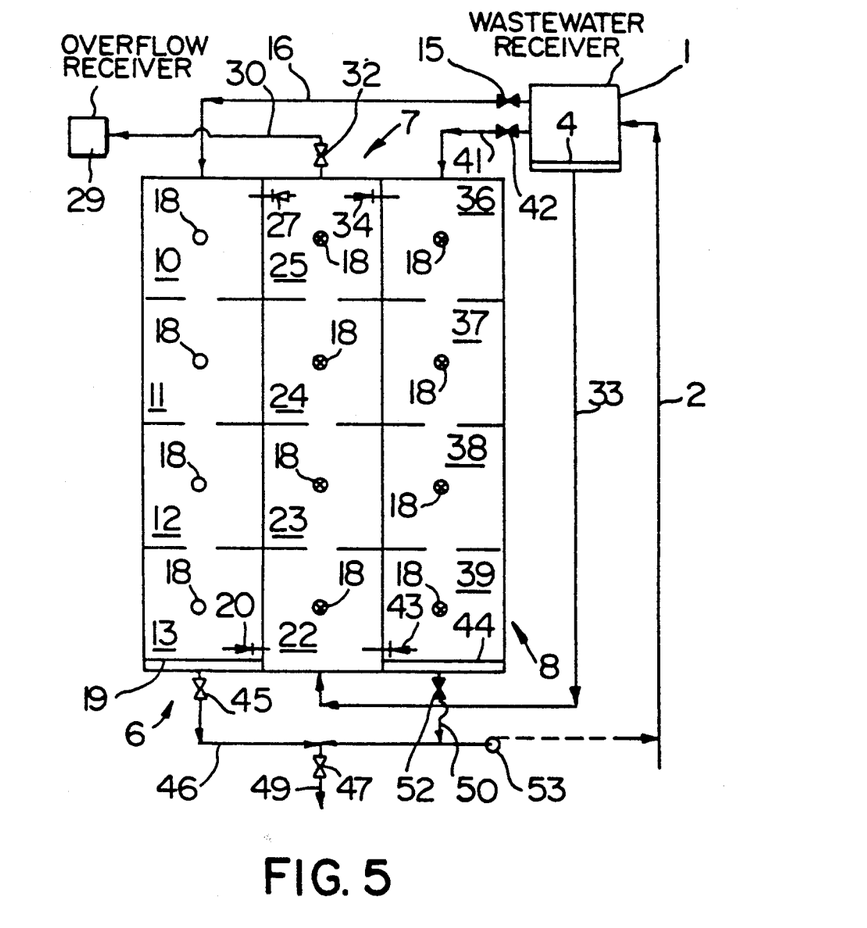
Figure 6:
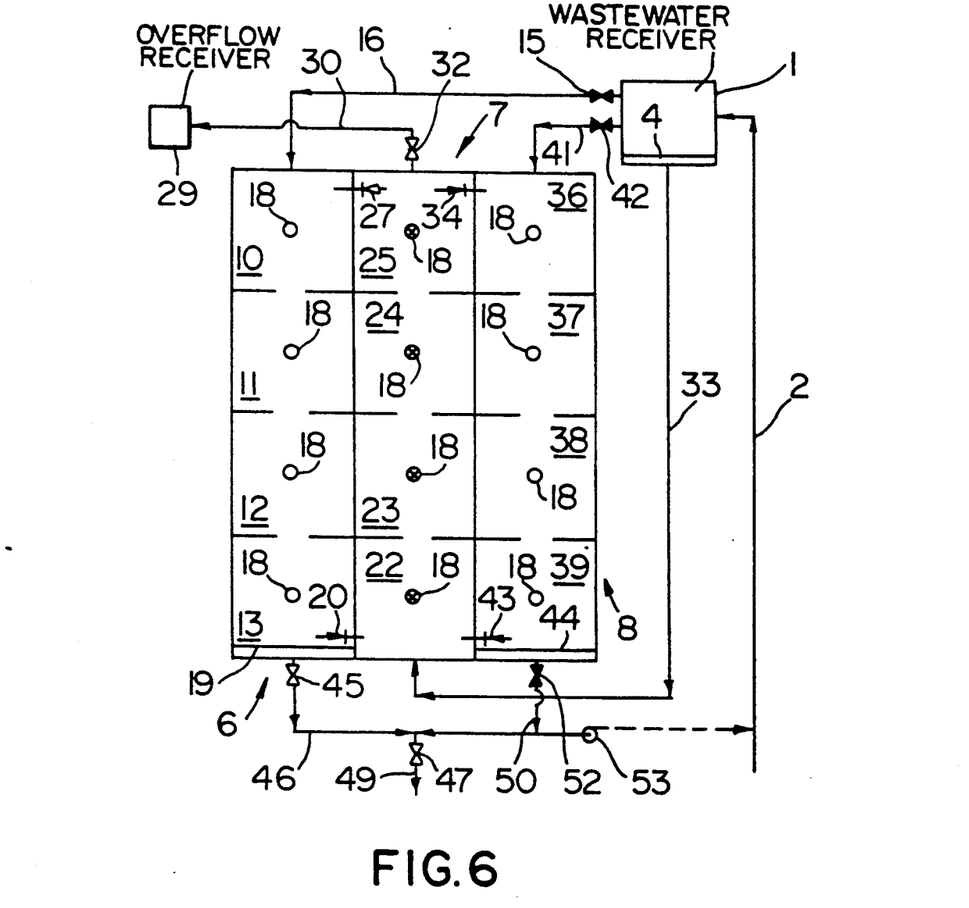
Figure 7:
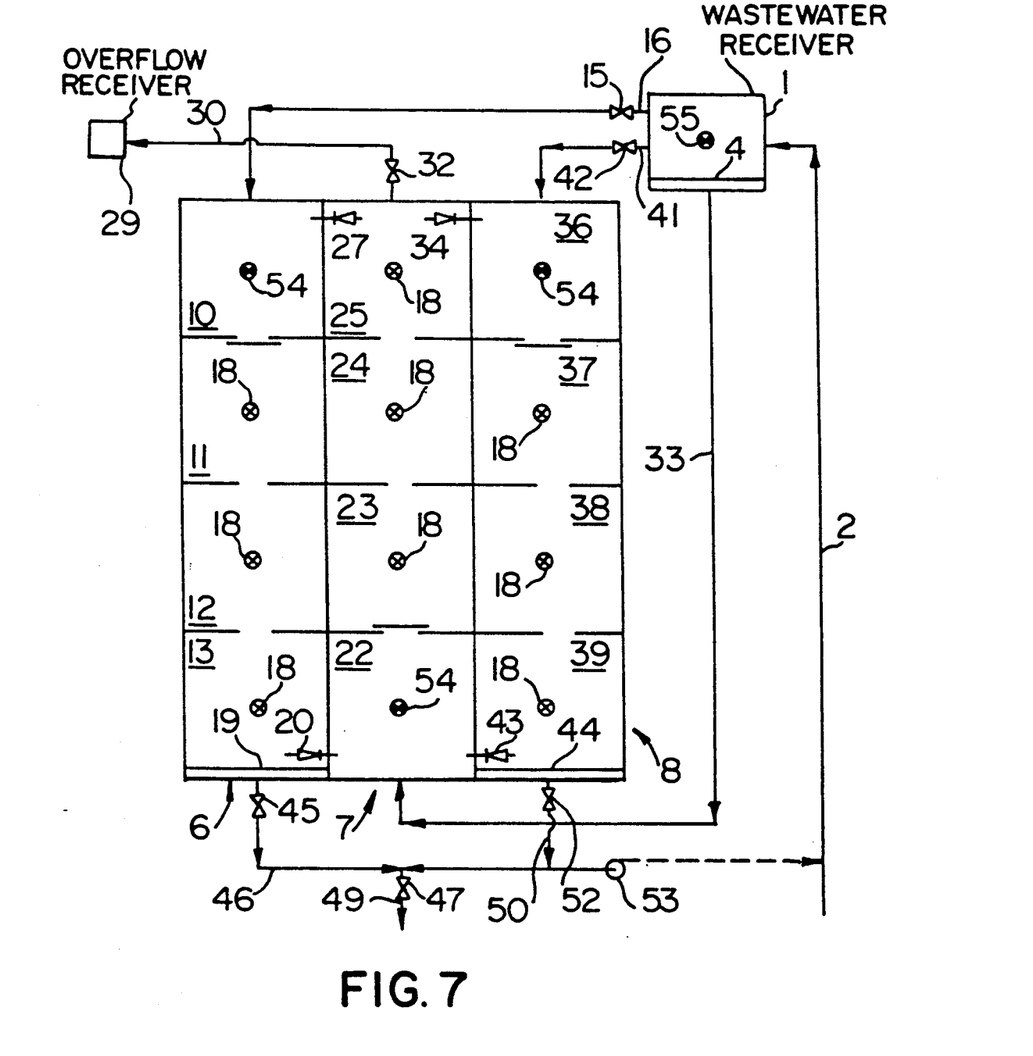
FIG. 7 is a schematic flow diagram of a second embodiment of the treatment system of the present invention.

With reference to FIG. 7, a nutrient removal version of the system includes essentially all of the elements of the apparatus illustrated in FIGS. 1 to 6. Treatment basins 6, 7 and 8 have been modified to include dedicated anaerobic cells 10, 22 and 36, each having a mixer 54.

For the sake of simplicity, only the borders of open valves have been shown in the drawings, while closed valves are illustrated as solid, black triangles. By the same token, the aerators 18 include a central "x" when they are operating, and a hollow circle when not in operation.

Referring again to FIG. 1, in all phases of operation, untreated wastewater is introduced through the pipe 2 into the inlet receptacle 1 for distribution to the remainder of the treatment system. Untreated wastewater typically will receive at least screening and degritting prior to treatment in the constant level system of the present invention. Wastewater leaves the inlet receptacle 1 via one of the lines 16, 33 or 41, and eventually leaves the treatment system via the outlet line 49.

During the first phase of operation (FIG. 1) the valves 15 and 52 are open, and the valves 42 and 45 are closed. Thus, wastewater flows into the first cell 10 of the first treatment basin 6 for aerobic treatment. The wastewater subsequently flows through cells 11, 12 and 13, and the open valve 20 into the first cell 22 of the second treatment basin 7. In the second treatment basin 7, the wastewater is treated aerobically while flowing through cells 22, 23, 24 and 25. The wastewater then flows through the open valve 34 into the first cell 36 of the third treatment basin 8. The valve 27 is closed to prevent the recycling of wastewater from the cell 25 to the cell 10 of the first treatment basin 6. In the first phase of operation, the aerators of cells 36 to 39 are not operational, and such cells permit settling of the sludge in the third treatment basin.

Figure 1:
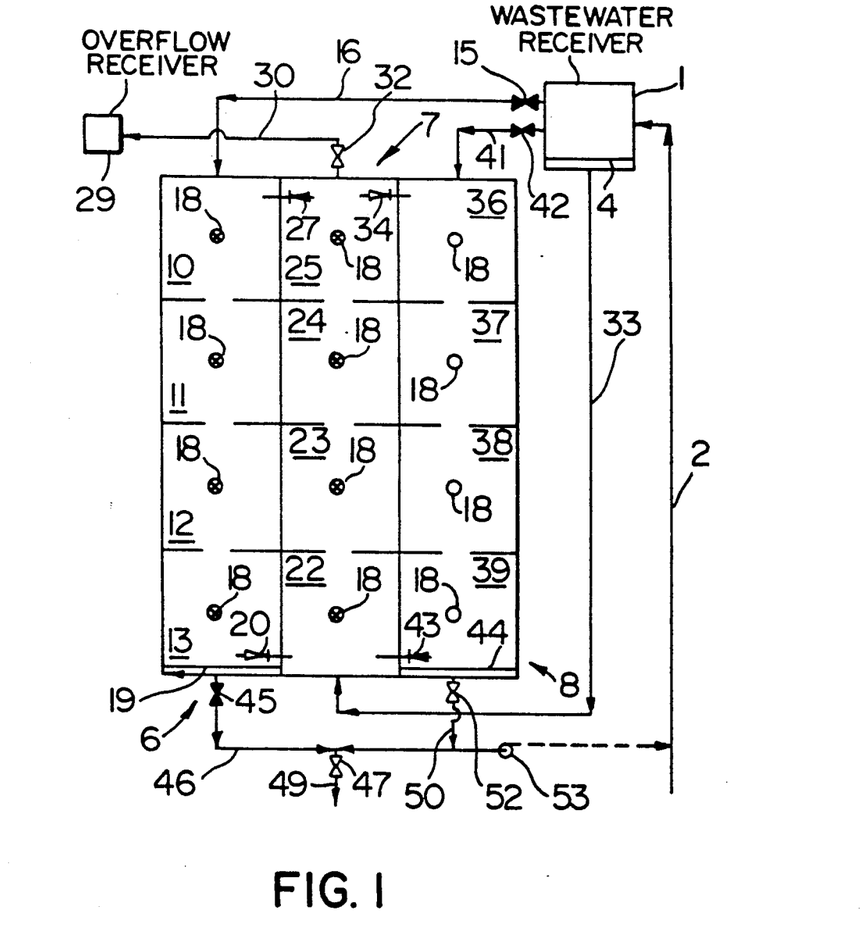
FIGS. 1 to 6 are schematic flow diagrams of a wastewater treatment system in accordance with the present invention.

When the cells 36 to 39 of the third treatment basin are being used as settling tanks, the valve 43 in the last cell 39 is closed to prevent the recycling of sludge to the third from the second treatment basin 7. Initial settling of biological solids is accomplished in the cell 36 of the third treatment basin 8. The wastewater then flows to cells 37, 38 and 39, respectively where the additional settling of solids is accomplished. The final treated effluent is discharged from the system over the constant level overflow weir 44, through the line 50 and the valve 47 in the line 49.

Typical operating time for phase one operation is approximately four and one-half hours. However, this time and the duration times of subsequent phases of operation may be adjusted to meet the specific treated effluent objectives depending on the untreated wastewater characteristics and flow.

At the beginning of the second phase of operation (FIG. 2) the valve 15 is closed, and the untreated wastewater depth in the inlet tank 1 rises to overflow the weir 4, automatically flowing through the line 33 to the first cell 22 of the second treatment basin 7. With the valves 20 and 43 closed, wastewater circulates through the second treatment basin 7 and the valve 34 into the third treatment basin 8. The final treated effluent overflows the weir 44 and is discharged through the lines 50 and 49 as described above. During this second phase operation, the cells 10 to 13 of the first treatment basin 6 continue to operate treating wastewater on a batch basis with no flow through for the duration of the second phase (approximately one hour). During the second phase, the cells 10 to 13 are aerated and oxygen demand is satisfied. In the second treatment basin 7, the final wastewater oxygen demand is satisfied before the wastewater passes into settling treatment basin 8.

Figure 2:
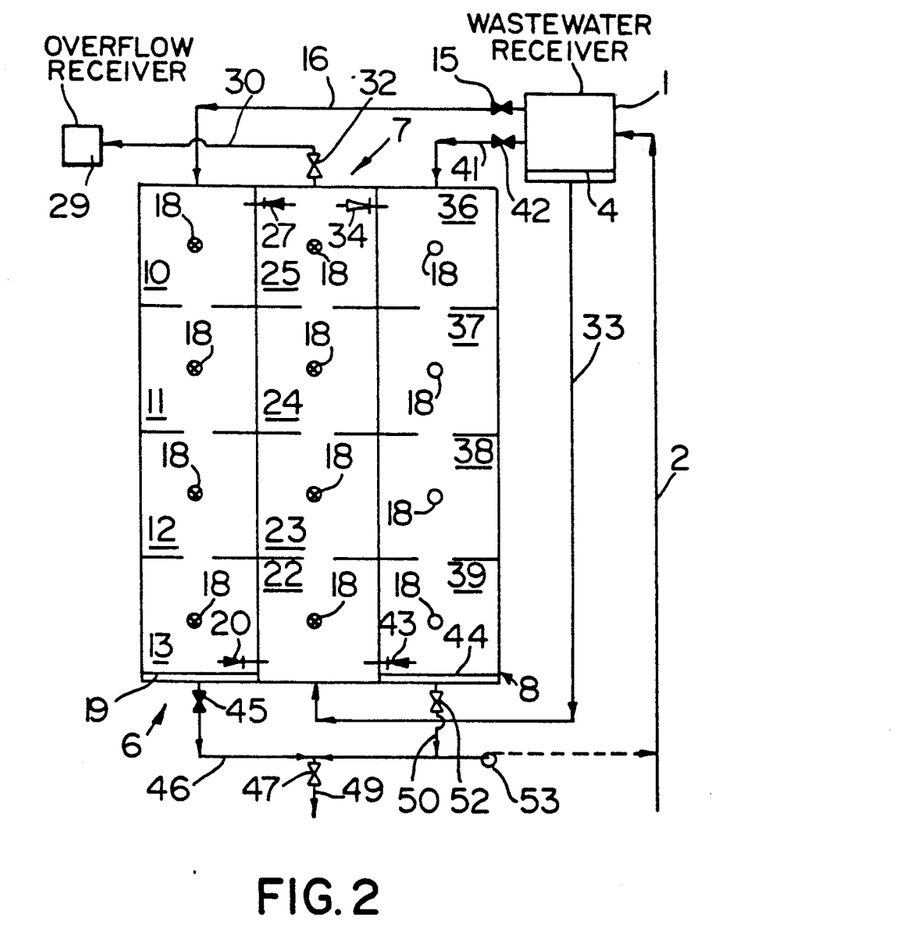

The mixers (not shown) and the aerators 18 in the second treatment basin 7 are operated at all times for all phases of operation.

At the beginning of the third phase of operation (FIG. 3), the aerators and mixers in cells 10 to 13 are shut off, and the wastewater in these cells is allowed to quiescently pre-settle for approximately one-half hour prior to being used as the continuous flow settling cells for subsequent operations. Throughout phase three, wastewater continues to flow in the same pattern as for phase two, i.e. into cell 22, through the second and third treatment basins 7 and 8, respectively.

Figure 4:
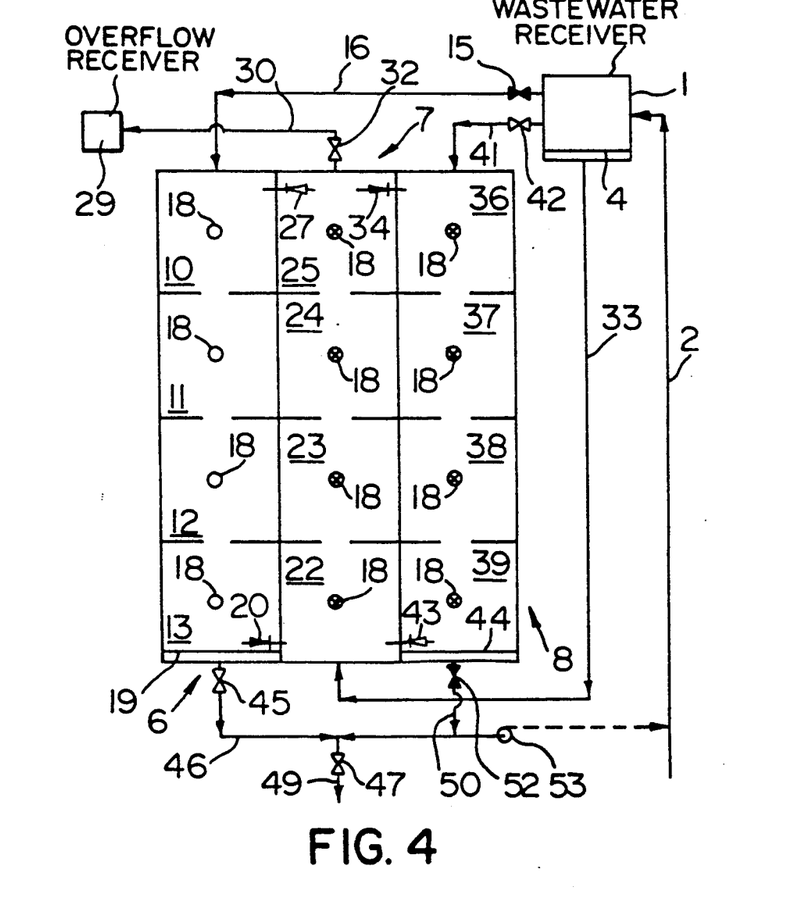

Referring to FIG. 4, at the beginning of the fourth phase of operation (FIG. 4) the discharge valve 52 is closed, and the valves 42 and 45 are open. The mixers and/or aerators in the cells 36 to 39 are actuated. The wastewater flow pattern is consequently the reverse of that for phase 1 (FIG. 1) for the three treatment basins 6, 7 and 8. The fourth phase is typically for four and one-half hours, and the remaining treatment sequence is identical to the first three phases described above. In the phase four operation, the wastewater flows in the same direction through cells 36 37 38 39 22 to 25 and 10 to 13. in that order, the effluent being discharged through the valve 45 in line 46 and the valve 47 in line 49. The one-way check valves 27 and 43 are open, and the check valves 20 and 34 are closed for this sequence of operation.

At the beginning of the fifth phase of operation (FIG. 5) the valve 42 is closed and untreated wastewater is automatically directed over the weir 4 and through the line 33 to the first cell 22 of the second treatment basin 7, as is the case in the phase two operation. Meanwhile, wastewater continues to flow in the same direction through the second and first treatment basins and 6, respectively for discharge over the weir 19.

After typically one hour of operation, the mixers and/or aerators for the cells 36 to 39 are shut off and a batch pre-settling period of approximately one-half hour is provided in phase 6 operation (FIG. 6).

Upon completion of the sixth phase of operation, the treatment cycle begins agains at phase one. The same sequence of operation is repeated continuously on an approximately twelve hour time cycle.

Typically, throughout each phase of operation, the valve 32 is open to waste excess biological sludge at a suitable rate to maintain the desired amount of activated sludge in the cells of each treatment basin 6, 7 and 8. The excess sludge is discharged to the receiver 29, and the supernatant is returned to the inlet line 2.

Figure 3:
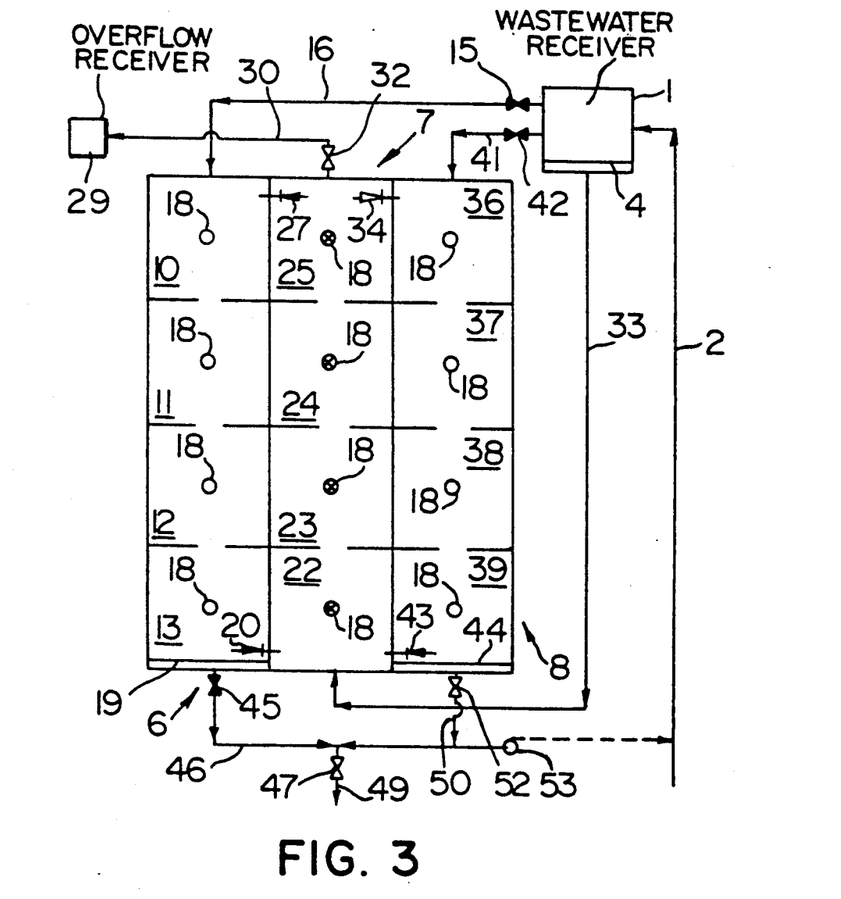

In the use of the embodiment of the invention shown in FIG. 7, untreated wastewater is introduced into the system through the inlet receptacle 1. For the first phase of operation, the first cell 10 would function anaerobically in the presence of substrate (FIGS. 3 and 5). Mixers (not shown) are used to promote the release of phosphorus from stressed organisms in the biological sludge stored in the cells during a previous settling phase. In the cells 11 to 13, luxury uptake of phosphorus occurs by the biological organisms, and carbonaceous and nitrogenous oxygen demand is satisfied. In the cell 22 (FIGS. 3 and 5) a second mixed anaerobic reactor achieves denitrification along with the release of phosphorus into the interstitial liquid. The operation of the system is the same as that shown in FIGS. 1 to 6. For the system of FIG. 7, the cells 10, 22 and 36 function as dedicated anaerobic reactors with dissolved oxygen levels of not greater than 0.0 mg/L. For such purpose, a mixer 54 in each such cell is operational.

A minor improvement of the performance of biological solids removal from the treated effluent for all embodiments of the invention can be achieved by closing the valve 47 for approximately two minutes at the same time as the valves 45 and 52 open at the beginning of the first and fourth phases of operation, respectively. At the same time, the pump 53 returns the weir trough contents of cells 13 and 39 to the inlet pipe 2 for at least four weir through volume detention times. The pumping time would be adjusted to ensure complete washout of biological solids previously accumulated in the overflow weir trough. At the end of this brief period, the pump 53 would be shut off, the valve 47 would open and the final treated effluent would flow through outlet pipe 49 to the final treated effluent receiving waters for the balance of the cycle until either valve 45 or 52 opens again.

Alternatively, instead of pumping effluent through the pump 53 to the inlet pipe 2, for some applications it would be feasible to divert the entire flow for approximately two minutes to the sludge wasting system (overflow receiver 29).

In effect, the present invention is a modified SBR process developed to achieve the high efficiency of organic contaminants and solids removal typical of the SBR process while eliminating the disadvantages of the SBR process by maintaining a constant level, continuous flow as achieved by the conventional activated sludge process. The invention also eliminates the major head loss problems as well as the relatively low volume-/use ratio of the SBR process and at the same time, for equivalent reactor capability uses less area for treatment than both the conventional activated sludge process and the SBR activated sludge process.

While the invention has been described as being intended for biological wastewater treatment systems, it will be appreciated that the invention could be used for other applications such as chemical flocculation and settling or anaerobic removal of contaminants from, e.g. the anaerobic contact process as well as other biological, chemical, or other processes requiring reaction or contact time and mixing followed by gravity clarification prior to completion of the process.

I claim:

1. An activated sludge wastewater treatment process comprising:
   (a) providing a reactor including first, second and third basins each defining an elongated flow path and each having an inlet end and an outlet end, means for hydraulically interconnecting the basins, first, second and third wastewater inlet means for respectively feeding wastewater from a wastewater receiver to the first or the second or the third basin, and first and second treated effluent outlet means for respectively discharging treated effluent from the outlet ends of the first and third basins,
   (b) the first phase steps of:
      (i) feeding wastewater from the wastewater receiver to the inlet end of the first basin while interrupting flow from the wastewater receiver to the second and third basins;
      (ii) permitting flow from the outlet end of the first basin into inlet end of the second basin and from the outlet end of the second basin into the inlet end of the third basin,
      (iii) discharging treated effluent from the outlet end of the third basin through the second treated effluent outlet means while preventing flow through the first treated effluent outlet means;
      (iv) subjecting wastewater in at least a portion of the first and second basins to aerobic treatment while interrupting aerobic treatment of the wastewater in the third basin to allow settling of the sludge in the third basin;
   (c) the second phase steps of:
      (i) feeding wastewater to be treated from the wastewater receiver to the inlet end of the second basin while preventing flow from the wastewater receiver to the first and third basins;
      (ii) permitting flow from the outlet end of the second basin into the inlet end of the third basin;
      (iii) discharging treated effluent from the outlet end of the third basin through the second treated effluent outlet means while preventing flow through the first treated effluent outlet means;
      (iv) subjecting wastewater in at least a portion of the first and second basins to aerobic treatment while interrupting aerobic treatment of the wastewater in the third basin to allow settling of the sludge in the third basin;
   (d) the third phase steps of:
      (i) feeding wastewater to be treated from the wastewater receiver to the inlet end of the second basin while preventing flow from the wastewater receiver to the first and third basins,
      (ii) permitting flow from the outlet end of the second basin to the inlet end of the third basin;
      (iii) discharging treated effluent from the outlet end of the third basin through the second treated effluent outlet means while preventing flow through the first treated effluent means;

(iv) subjecting wastewater in at least a portion of the second basin to aerobic treatment while interrupting aerobic treatment of wastewater in the first and third basins to allow settling of the sludge therein;

(e) the fourth phase steps of:
  (i) feeding wastewater from the wastewater receiver to the inlet end of the third basin while preventing flow from the wastewater receiver to the first and second basins;
  (ii) permitting flow from the outlet end of the third basin into the inlet end of the second basin and from the outlet end of the second basin into the inlet end of the first basin;
  (iii) discharging treated effluent from the outlet end of the first basin through the first treated effluent outlet means while preventing flow through the second treated effluent means;
  (iv) subjecting wastewater in at least a portion of the third and second basins to aerobic treatment while interrupting aerobic treatment of wastewater in the first basin to allow settling of the sludge in the first basin;

(f) the fifth phase steps of:
  (i) feeding wastewater from the wastewater receiver to the inlet end of the second basin while preventing flow from the wastewater receiver to the first and third basins;
  (ii) permitting flow from the outlet end of the second basin into the inlet end of the first basin;
  (iii) discharging treated effluent from the outlet end of the first basin through the first treated effluent outlet means while preventing flow through the second treated effluent outlet means;
  (iv) subjecting wastewater in at least a portion of the third and second basins to aerobic treatment while interrupting aerobic treatment of wastewater in the first basin to allow settling of the sludge therein;

(g) the sixth phase steps of:
  (i) feeding wastewater to be treated from the wastewater receiver to the inlet end of the second basin while preventing flow from the wastewater receiver to the first and third basins;
  (ii) permitting flow from the outlet and end of the second basin into the inlet end of the first basin;
  (iii) discharging treated effluent from the outlet end of the first basin through the first treated effluent inlet means while preventing flow through the second treated effluent outlet means;
  (iv) subjecting wastewater in at least a portion of the second basin to aerobic treatment and interrupting aerobic treatment of wastewater in the first and third basins to allow settling of the sludge therein;

(h) repeating the first to sixth phase steps.

2. A treatment process according to claim 1 wherein the duration of the first to sixth phases in each cycle of operation are approximately 4.5 hours, 1 hour, 0.5 hour, 4.5 hours, 1 hour and 0.05 hour, respectively.

3. A treatment process according to claim 1 including removing excess sludge from the second basin.

4. A treatment process according to claim 1 including continuously removing excess sludge from the second basin at a rate to maintain activated sludge at a desired solids level in all basins.

5. A treatment process according to claim 1 wherein each basin comprises a plurality of cells serially interconnected between the inlet and outlet ends of each basin.

6. A treatment process according to claim 1 including the step of mixing wastewater in a cell at the inlet end of each basin.

7. A treatment process according to claim 1 including continuously discharging the treated effluent through a constant level overflow weir in the third basin during the first, second and third phases and continuously discharging the treated effluent through a constant level overflow weir in the first basin during the fourth, fifth and sixth phases to maintain the liquid level in the basins substantially constant.

8. A treatment process according to claim 7 including diverting treated effluent from the second treated effluent outlet means away from a final effluent discharge line for a brief period at the beginning of the first phase to purge the weir in the third basin, and diverting treated effluent from the first treated effluent outlet means away from a final effluent discharge line for a brief period at the beginning of the fourth phase to purge the weir in the first basin.

9. A treatment process according to claim 7 including anaerobically mixing wastewater in the inlet end of the first basin during the first phase, and anaerobically mixing wastewater in the inlet end of the third basin during the fourth phase.

10. A treatment process according to claim 9 including anaerobically mixing wastewater in the inlet end of the second basin during each phase.

* * * * *